United States Patent [19]

Mattei et al.

[11] Patent Number: 4,720,619
[45] Date of Patent: Jan. 19, 1988

[54] DEVICE FOR PIERCING HOLES IN ROD-SHAPED ITEMS

[75] Inventors: Riccardo Mattei; Armando Neri, both of Bologna; Maichi Cantello, Anglié; Santo R. Gobbi, Pavia, all of Italy

[73] Assignee: G.D. Societa per Azioni, Via Pomponia, Italy

[21] Appl. No.: 714,883

[22] Filed: Mar. 22, 1985

[30] Foreign Application Priority Data

Mar. 22, 1984 [IT] Italy .................................. 3390 A/84

[51] Int. Cl.[4] ............................................. B23K 26/00
[52] U.S. Cl. ...................... 219/121 LK; 219/121 LT; 219/121 LV; 219/121 LW; 131/281
[58] Field of Search ................. 219/121 LL, 121 LK, 219/121 LU, 121 LV, 121 LW, 121 LS, 121 LT, 121 LM, 384; 350/6.8, 486; 131/281

[56] References Cited

U.S. PATENT DOCUMENTS

| 4,224,497 | 9/1980 | Duley et al. | ................. | 219/121 LM |
| 4,378,480 | 3/1983 | Langlmans | ................. | 219/121 LT |
| 4,404,452 | 9/1983 | Cashwell | ................. | 219/121 LK |
| 4,524,785 | 6/1985 | Seragnoli et al. | ............. | 219/121 LS |
| 4,565,202 | 1/1986 | Seragnoli et al. | ............. | 219/121 LK |

*Primary Examiner*—M. H. Paschall
*Attorney, Agent, or Firm*—Frost & Jacobs

[57] ABSTRACT

A device for piercing holes in rod-shaped items particularly cigarettes, on which the items are housed inside respective recesses mounted so as to rotate around their own axes on a conveyor moving cross wise in relation to the recesses. A focusing lens is associated with each respective recess. When the conveyor is operated, the focusing lenses are struck successively by a pulsating laser beam and reflected by a reflecting device located between the laser source and the route travelled by the focusing lenses. The beam is then focused by the focusing lenses on to the periphery of the relative items as they turn.

5 Claims, 3 Drawing Figures

DEVICE FOR PIERCING HOLES IN ROD-SHAPED ITEMS

BACKGROUND OF THE INVENTION

The present invention relates to a device for piercing holes in rod-shaped items.

The present invention is particularly suitable for producing smoking commodities, especially cigarettes, to which the following description refers solely by way of a non-limiting example.

The cigarette manufacturing industry is known to produce so-called "ventilated" cigarettes, i.e. cigarettes with a number of holes in the area of the filter. This enables smokers to inhale a certain amount of air together with the smoke, in such a manner as to dilute the smoke intake and reduce both its temperature and content of harmful substances.

The ventilating holes are known to be formed using piercing devices comprising a laser source, possibly pulsating, and a focusing device designed to direct the laser beam on to the cigarettes as they travel along a given route, possibly also turning round their own axes.

On the aforementioned known types of piercing devices, the focusing device is usually assigned a reflecting member designed to direct the focused beams on to the cigarettes in such a manner as to follow them as they are moved along.

One of the major drawbacks of piercing devices of the aforementioned type is that the holes so formed are usually irregular in shape and unevenly arranged round the cigarettes. The main reason for this is that the laser source, the focusing device and the associated reflecting member are generally located some distance away from the cigarettes being pierced. The movement of the cigarettes along the given route is determined by a conveying device supported separately from the respective piercing device. As the piercing device is thus unaffected by the vibration usually imparted on the cigarettes by the conveying device, the cigarettes being pierced depart unpredictably from what should be a given ideal route.

SUMMARY OF THE INVENTION

The aim of the present invention is to provide a laser piercing device designed to overcome the aforementioned drawback.

With this aim in view, the present invention relates to a device for piercing holes in rod-shaped items, particularly cigarettes, the device comprising a conveyor, designed to convey a number of the items arranged crosswise in relation to the travelling direction of the conveyor itself, activating means, designed to turn the items in relation to the conveyor and round their own axes at a given speed, at least one laser source, designed to generate at least one pulsating laser beam, and a focusing device designed to focus each said laser beam successively on to the travelling items, characterised by the fact that the focusing device comprises, for each item on the conveyor, a focusing lens mounted on the conveyor adjacent to the relative item; reflecting means being provided for directing the beam successively on to the focusing lenses and for holding it there for as long as it takes each of the focusing lenses to travel over a respective given section of its travelling route.

BRIEF DESCRIPTION OF THE DRAWINGS

The present invention will now be described with reference to the attached drawings in which.

DETAILED DESCRIPTION OF THE INVENTION

Figure 1:
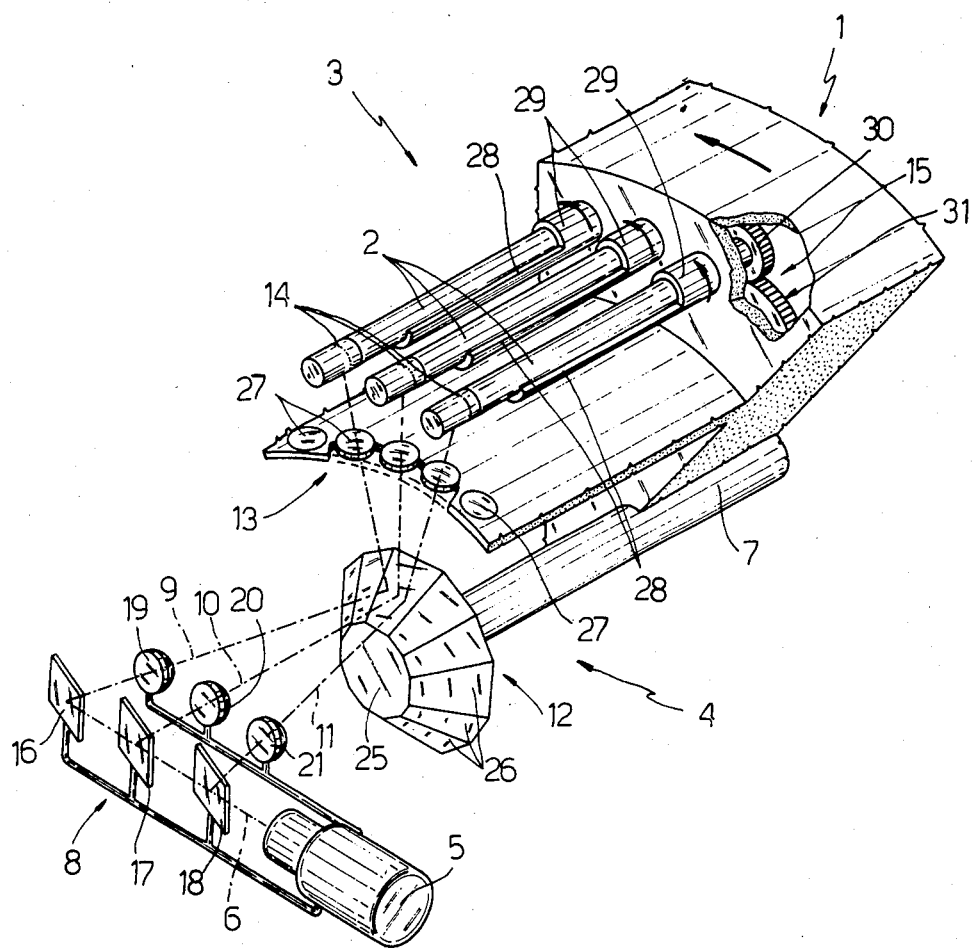
FIG. 1 shows a view in perspective, with parts sectioned and removed for clarity, of a piercing device according to the present invention.

Number 1 on the attached drawings indicates a conveyor or feed roller for items 2 which, in the following description, consist of cigarettes. The roller 1 is mounted on a filter assembling machine numbered as a whole by 3. Roller 1 forms part of a piercing device indicated as a whole by 4 and also comprising a pulsating laser source 5, designed to emit a laser beam 6 in a direction essentially perpendicular to the axis of centre shaft 7 on roller 1. A dividing device 8 is designed to divide beam 6 into a number of beams essentially parallel with the axis of roller 1. In the embodiment shown, the beams are three in number, 9, 10 and 11, and converge slightly towards roller 1 and fall in a plane essentially parallel with the axis of roller 1.

Piercing device 4 comprises a reflecting means, consisting of a reflecting device 12 turning with roller 1 and designed to reflect beams 9, 10 and 11 essentially radially outwards. The piercing device 4 also comprises a focusing device 13, turning with roller 1 and designed to focus beams 9, 10 and 11 on to the periphery of respective cigarettes 2 for piercing a ring of holes 14 on the same. Lastly, the piercing device 4 includes a rotating device 15 designed to turn cigarettes 2 around their own axes as they are moved along by roller 1, which turns around the axis of shaft 7.

Figure 2:
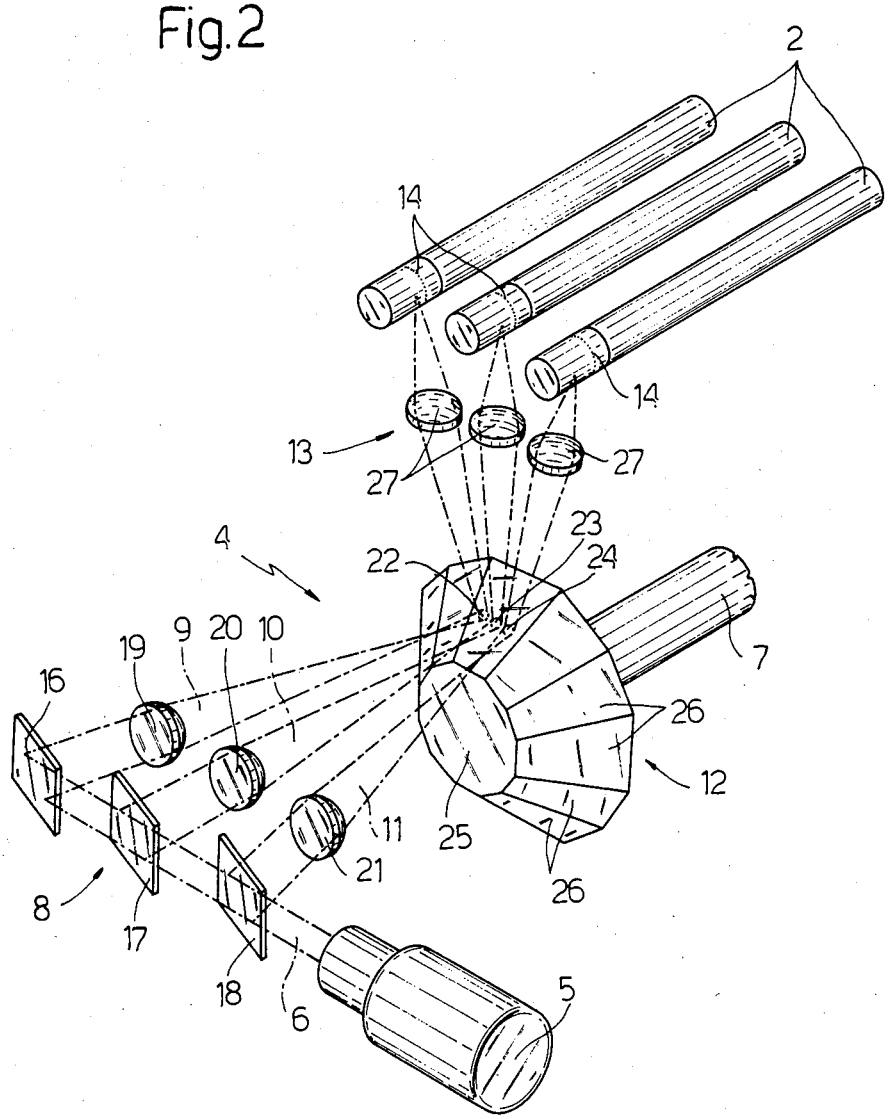
FIG. 2 shows a view in perspective of a detail in FIG. 1.

As shown in FIG. 2, a dividing device 8 comprising three mirrors, 16, 17 and 18, is arranged in line along the axis of beam 6. The mirrors each form an angle of essentially 45° with the axis of beam 6. In more detail, mirror 16 is a fully reflecting mirror, whereas the other two mirrors, 17 and 18, are semitransparent, designed to reflect half and a third of the incident rays respectively, so as to render beams 9, 10 and 11 essentially of the same intensity. Dividing device 8 also comprises focusing means comprising three focusing lenses, 19, 20 and 21, located between respective mirrors 16, 17 and 18 and the reflecting device 12. The focusing lenses 19, 20 and 21 are designed to focus respective beams 9, 10 and 11 on to points upstream from reflecting device 12, in such a manner as to produce, on the same, light beams 22, 23 and 24 of a given surface area.

Reflecting device 12 comprises a reflecting body 25 coaxial with shaft 7 having the external shape of a truncated pyramid with a number of flat reflecting faces 26, the number of the latter being $k = n/x$, where $n =$ the maximum number of cigarettes 2 that may be carried on roller 1, and $x =$ the maximum number of beams, three in the example shown, capable of striking each face 26 simultaneously and which, in the example described, is equal to the number of beams into which beam 6 is divided. Focusing device 13 comprises n number of focusing lenses 27, i.e. equal to the maximum number of cigarettes 2 that may be carried on roller 1. The focusing lenses 27 are supported on and evenly arranged round roller 1. Each lens 27 is assigned a respective gondola 28 (see FIG. 1) extending axially along the outer periphery of and supported by roller 1. In more detail, each lens 27 is arranged radially inside its respective gondola 28 on roller 1, the clearance between the lens 27 and the gondola 28 being roughly equal to the diameter of cigarettes 2. Each gondola 28 forms a recess for housing a respective cigarette 2 positioned so that one end projects from its respective gondola 28 and faces respective lens 27.

As shown in FIG. 1, each gondola 28 is turned by roller 1 around the axis of shaft 7 and is connected to roller 1 in such a manner as to turn around its own axis in relation to the roller. For this purpose, each gondola 28 is provided with an axial shaft 29 connected in rotary manner to roller 1. Each gondola 28 has a drive gear 30 which constitutes the final part of a drive device, indicated as a whole by 31, to turn gondolas 28 around their own axes at a given speed along with the rotation of roller 1 around the axis of shaft 7.

In connection with the aforementioned dividing device 8, it should be pointed out that the slight convergence of beams 9, 10 and 11 provides for concentrating, at least for a certain length of time, all three light beams 22, 23 and 24 on to the same reflecting face 26. Lenses 19, 20 and 21 also contribute towards this by controlling the size of each light beam 22, 23 and 24.

On striking one of the reflecting faces 26, each of beams 9, 10 and 11 is reflected by the face 26 on to a respective lens 27.

Following the rotation of body 25, each of the light beams 22, 23 and 24 moves on to the next reflecting face 26. Simultaneously, the relative reflected beam 9, 10 and 11 abandons the lens 27 associated with their respective cigarettes 2 and switches over to strike other lens 27 associated with other cigarettes 2 located upstream from the previous lens. During this time, generally referred to as the "piercing time", a relative cigarette 2 is carried by roller 1 over a "piercing arc" over which a ring of holes 14 is pierced on the outer periphery of cigarette 2. For this purpose, each drive device 31 turns the relative gondola 28 through an essentially complete rotation around its own axis during the piercing time. Furthermore, the pulse frequency of laser source 5 is such that, over a time period equal to the piercing time, the number of pulses emitted equals the number of holes 14 to be pierced in each cigarette 2.

In connection with dividing device 8, it should be pointed out that beam 6 is divided into three parts for purely construction reasons, seeing as the beam 6 could either be divided into other than three parts or not at all (in which case, faces 26 would be equal in number to gondolas 28, piercing times would be reduced to one third, the rotation speeds of gondolas 28 would be three times faster and the power of source 5 reduced).

Figure 3:
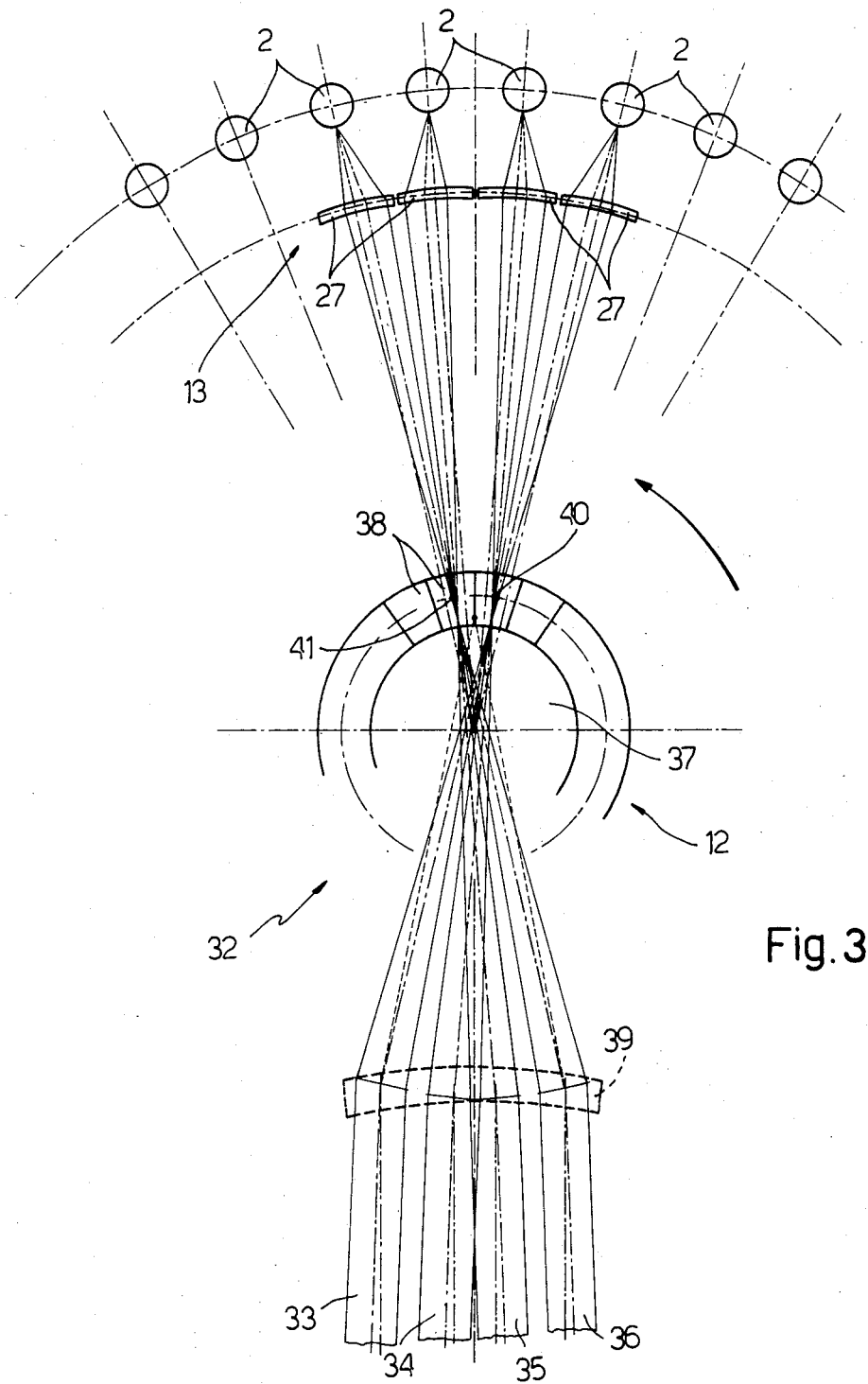
FIG. 3 shows a plan development of a variation of the FIG. 2 detail.

By way of confirmation, FIG. 3 shows a piercing device 32 employing four pulsating laser beams 33, 34, 35 and 36. Obviously, the beams could be obtained either by dividing an original beam emitted by a single source into four equal parts using semitransparent mirrors similar to mirrors 17 and 18, or by using two separate laser sources with the beam of each divided into two parts, or by using four separate laser sources. This also applies, of course, to device 4.

As shown in FIG. 3, piercing device 32 comprises a focusing device essentially identical to device 13 and numbered using the same reference numbers. Rotary reflecting device 12 on piercing device 32, however, comprises a rotary reflecting body 37 shaped in the form of a truncated pyramid but having externally $h = n/2$ number of flat reflecting faces 38, where $n =$ the maximum number of cigarettes 2 carried on roller 1.

According to a variation not shown, provision may be made upstream from reflecting device 12 for four focusing lenses similar to lenses 19, 20 and 21, or, as shown in FIG. 3, for a focusing means comprising a single essentially parabolic focusing lens 39.

The lens 39 (or the four lenses not shown) is set up in such a manner as to focus beams 33, 34, 35 and 36 in twos on to two points slightly upstream from body 37, and to cause them to converge on body 37 in such a manner as to produce two light beams 40 and 41. The distance between the two light beams 40 and 41 being essentially equal to the width of faces 38. In more detail, the convergence of lens 39 is such that beam 40 relative to beams 33 and 34 is located upstream from beam 41 relative to beams 35 and 36, in the rotational direction of reflecting body 37.

As on device 4 and device 32, each beam 33–36 strikes a respective face 38 and is reflected on to a respective lens 27 for as long as the relative beam 40 or 41 remains on the same face 38. Unlike device 4, however, each lens 27 is first followed by one of the two beams originating from beam 40 and then by one of the two beams originating from beam 41.

In the case of device 32, therefore, the time taken by each of beams 33–36 to sweep one of faces 38 is equal to only half of the "piercing time", and the corresponding arc over which each cigarette 2 is carried by conveyor 1 is equal to only half of the "piercing arc". Consequently, each of beams 33–36 will be pulsated in such a manner as to pierce on each cigarette it strikes only half of the holes in ring 14 during the time taken by the beam to sweep one face 38.

In other words, each cigarette 2 will be rotated around its own axis at constant speed to make one full rotation around its own axis in the time taken by each beam 33–36 to sweep two adjacent faces 38.

During the piercing time, each cigarette 2 will be pierced with a first half of the holes in ring 14 by one of the beams originating from beam 40, whereas the other half of the holes will be pierced immediately afterwards by one of the beams originating from beam 41.

We claim:

1. A device for piercing holes in cigarettes, said device comprising a conveyor to convey along a predetermined path a number of said cigarettes arranged crosswise in relation to the traveling direction of the conveyor; drive means to rotate said cigarettes in relation to said conveyor around their own axes at a given speed; at least one laser source for generating at least one pulsating laser beam; and a focusing device to focus each said laser beam successively onto said cigarettes, said focusing device including a focusing lens mounted on said conveyor adjacent to each of said cigarettes for focusing said laser beam onto said cigarettes, reflecting means comprising a reflecting body shaped essentially in the form of a truncated pyramid, coaxially with and rotating with said conveyor for directing said laser beam successively onto said focusing lenses for a predetermined period of time equal to the time it takes each of said focusing lenses to travel with said conveyor over a respective given section of said predetermined path to permit said laser beam to pierce holes in said cigarettes.

2. A device according to claim 1, wherein said conveyor comprises a roller drum rotating around its own axis and having a number of recesses positioned about its periphery for holding said cigarettes, each recess comprising a gondola connected to said drive means, said gondola turning around its own longitudinal axis parallel with said axis of rotation of said roller drum.

3. A device according to claim 2, wherein said reflecting body includes a number of flat inclined faces being equal in number to said recesses divided by the maximum number of said laser beams striking said faces.

4. A device according to claim 3, wherein said beams are three in number; and further including focusing means for directing said laser beams onto said reflecting body, said beams sweeping successively said faces of said reflecting body as it rotates with said roller drum for said predetermined period of time during which all three of said laser beams strike one of said faces simultaneously.

5. A device according to claim 3, whereby said laser beams are four in number; and further including focusing means for directing said laser beams onto said reflecting body and for concentrating said laser beams in twos on two separate faces of said reflecting body.

* * * * *